(12) United States Patent
Brandwine et al.

(10) Patent No.: US 10,887,348 B1
(45) Date of Patent: Jan. 5, 2021

(54) DETECTION OF NETWORK TRAFFIC INTERCEPTION

(71) Applicant: Amazon Technologies, Inc., Seattle, WA (US)

(72) Inventors: Eric Jason Brandwine, Haymarket, VA (US); Peter Zachary Bowen, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 15/669,812

(22) Filed: Aug. 4, 2017

(51) Int. Cl.
    *H04L 29/06* (2006.01)

(52) U.S. Cl.
    CPC .......... *H04L 63/20* (2013.01); *H04L 63/0428* (2013.01); *H04L 63/1416* (2013.01); *H04L 63/1466* (2013.01); *H04L 63/166* (2013.01)

(58) Field of Classification Search
    CPC . H04L 63/20; H04L 63/0428; H04L 63/1416; H04L 63/1466; H04L 63/166
    See application file for complete search history.

(56) References Cited

U.S. PATENT DOCUMENTS

| | | | | |
|---|---|---|---|---|
| 8,340,283 B2 * | 12/2012 | Nadalin | ................... | H04L 63/02 380/28 |
| 8,621,618 B1 * | 12/2013 | Ramsey | .............. | H04L 63/1408 370/392 |
| 2006/0143700 A1 | 6/2006 | Herrmann | | |
| 2006/0282545 A1 | 12/2006 | Arwe et al. | | |
| 2009/0003663 A1 | 1/2009 | Webster | | |
| 2009/0094671 A1 * | 4/2009 | Kurapati | ............. | H04L 63/1458 726/1 |
| 2011/0185421 A1 * | 7/2011 | Wittenstein | ........... | G06F 21/554 726/22 |
| 2014/0196108 A1 | 7/2014 | Barr et al. | | |
| 2017/0012988 A1 * | 1/2017 | Turgeman | ............... | H04L 67/28 |
| 2017/0111233 A1 * | 4/2017 | Kokkula | ............... | H04L 41/145 |
| 2018/0004948 A1 * | 1/2018 | Martin | ................ | H04L 63/1425 |

OTHER PUBLICATIONS

Kanno, S., and M. Kanda, "Addition of the Camellia Cipher Suites to Transport Layer Security (TLS)," Request for Comments: 6367, Informational, Sep. 2011, 9 pages.

Salter, M., and R. Housley, "Suite B Profile for Transport Layer Security (TLS)," Request for Comments: 6460, Informational, Jan. 2012, 15 pages.

Mcgrew, D., and D. Bailey, "AES-CCM Cipher Suites for Transport Layer Security (TLS)," Request for Comments: 6655, Standards Track, Jul. 2012, 8 pages.

(Continued)

*Primary Examiner* — Eleni A Shiferaw
*Assistant Examiner* — Bassam A Noaman
(74) *Attorney, Agent, or Firm* — Davis Wright Tremaine LLP

(57) ABSTRACT

A network security service is provided to detect various intermediaries to a network connection between a client and a destination service, such as a man-in-the-middle (MITM). The network security service may obtain session feature information indicating attributes of the network connection. Based at least in part on the session feature information the network security service may detect an intermediary and perform a security measure.

20 Claims, 8 Drawing Sheets

(56) References Cited

OTHER PUBLICATIONS

Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
Bowen, P. Z., "Detection of Modified Requests," U.S. Appl. No. 15/178,385, filed Jun. 9, 2016.
Sharifi Mehr, N., and E.D.K. Villiers, "Malicious Client Detection Based on Usage of Negotiable Protocols," U.S. Appl. No. 14/472,002, filed Aug. 28, 2014.
Durumeric, Z., et al., "The Security Impact of HTTPS Interception," Network and Distributed Systems Symposium, Feb. 26-Mar. 1, 2017, San Diego, California, 14 pages.
Holt, M., "Detecting HTTPS Interception, User Guide," Caddy, © 2015-2017 Light Code Labs, <https://caddyserver.com/docs/mitm-detection> [retrieved Jul. 20, 2017], 10 pages.
Bowen, P. Z., "Malicious Client Detection Based on Usage of Negotiable Protocols," U.S. Appl. No. 14/472,002, filed Aug. 28, 2014.
Atkinson, R., "Security Architecture for the Internet Protocol," Request for Comments: 1825, Standards Track, Aug. 1995, 23 pages.
Atkinson, R., "IP Authentication Header," Request for Comments: 1826, Standards Track, Aug. 1995, 14 pages.
Atkinson, R., "IP Encapsulating Security Payload (ESP)," Request for Comments: 1827, Standards Track, Aug. 1995, 13 pages.
Metzger, P., et al., "IP Authentication Using Keyed MD5," Request for Comments: 1828, Standards Track, Aug. 1995, 6 pages.
Karn, P., et al., "The ESP DES-CBC Transform," Request for Comments: 1829, Standards Track, Aug. 1995, 11 pages.
Dierks, T., et al., "The TLS Protocol Version 1.0," Request for Comments: 2246, Standards Track, Jan. 1999, 75 pages.
Kent, S., and R. Atkinson, "Security Architecture for the Internet Protocol," Request for Comments: 2401, Standards Track, Nov. 1998, 62 pages.
Orman, H., "The OAKLEY Key Determination Protocol," Request for Comments: 2412, Informational, Nov. 1998, 56 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.
Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Kent, S., and K. Seo, "Security Architecture for the Internet Protocol," Request for Comments: 4301, Standards Track, Dec. 2005, 102 pages.
Kent, S., "IP Encapsulating Security Payload (ESP)," Request for Comments: 4303, Standards Track, Dec. 2005, 45 pages.
Housley, R., "Using Advanced Encryption Standard (AES) CCM Mode With IPsec Encapsulating Security Payload (ESP)," Request for Comments: 4309, Standards Track, Dec. 2005, 14 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
Mcgrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Eastlake, D., "Transport Layer Security (TLS) Extensions: Extension Definitions," Request for Comments: 6066, Standards Track, Jan. 2011, 25 pages.
Tuexen, M., et al., "Datagram Transport Layer Security (DTLS) for Stream Control Transmission Protocol (SCTP)," Request for Comments: 6083, Standards Track, Jan. 2011, 10 pages.
Mavrogiannopoulos, N., and D. Gillmor, "Using OpenPGP Keys for Transport Layer Security (TLS) Authentication," Request for Comments: 6091, Informational, Feb. 2011, 9 pages.

(56) References Cited

OTHER PUBLICATIONS

Turner, S., and T. Polk, "Prohibiting Secure Sockets Layer (SSL) Version 2.0," Request for Comments: 6176, Standards Track, Mar. 2011, 4 pages.

Kim, W., et al., "Addition of the ARIA Cipher Suites to Transport Layer Security (TLS)," Request for Comments: 6209, Informational, Apr. 2011, 10 pages.

Rescorla, E., and N. Modadugu, "Datagram Transport Layer Security Version 1.2," Request for Comments: 3347, Standards Track, Jan. 2012, 33 pages.

* cited by examiner

US 10,887,348 B1

DETECTION OF NETWORK TRAFFIC INTERCEPTION

BACKGROUND

Computer network server administrators often implement various mechanisms to prevent the exploitation of network servers and other computer systems by hackers and other nefarious entities. In many instances, a client device will establish a connection with a server, for example, and send requests over that connection. It is possible, however, that a third party (intended or unintended) intercepts this connection, and can then send and receive requests that appear to come from the intended parties to the connection. In many instances it can be difficult for the server to determine when a "man in the middle" (MITM) is legitimate (e.g., a proxy implemented by the computer network administrator) or an attacker. Many defensive mechanisms used to prevent such exploitation of network servers often involve use of application layer information to verify the authenticity of a client attempting to communicate with the network server. For example, Hypertext Transfer Protocol Secure (HTTPS) requests include an informational field usable by the network server to determine the application (user agent) utilized by a client to access the network server. However, such information may be easily manipulated to any value making it difficult for computer network administrator to determine whether the connection is legitimate or not.

BRIEF DESCRIPTION OF THE DRAWINGS

Various techniques will be described with reference to the drawings, in which.

DETAILED DESCRIPTION

Figure 1:
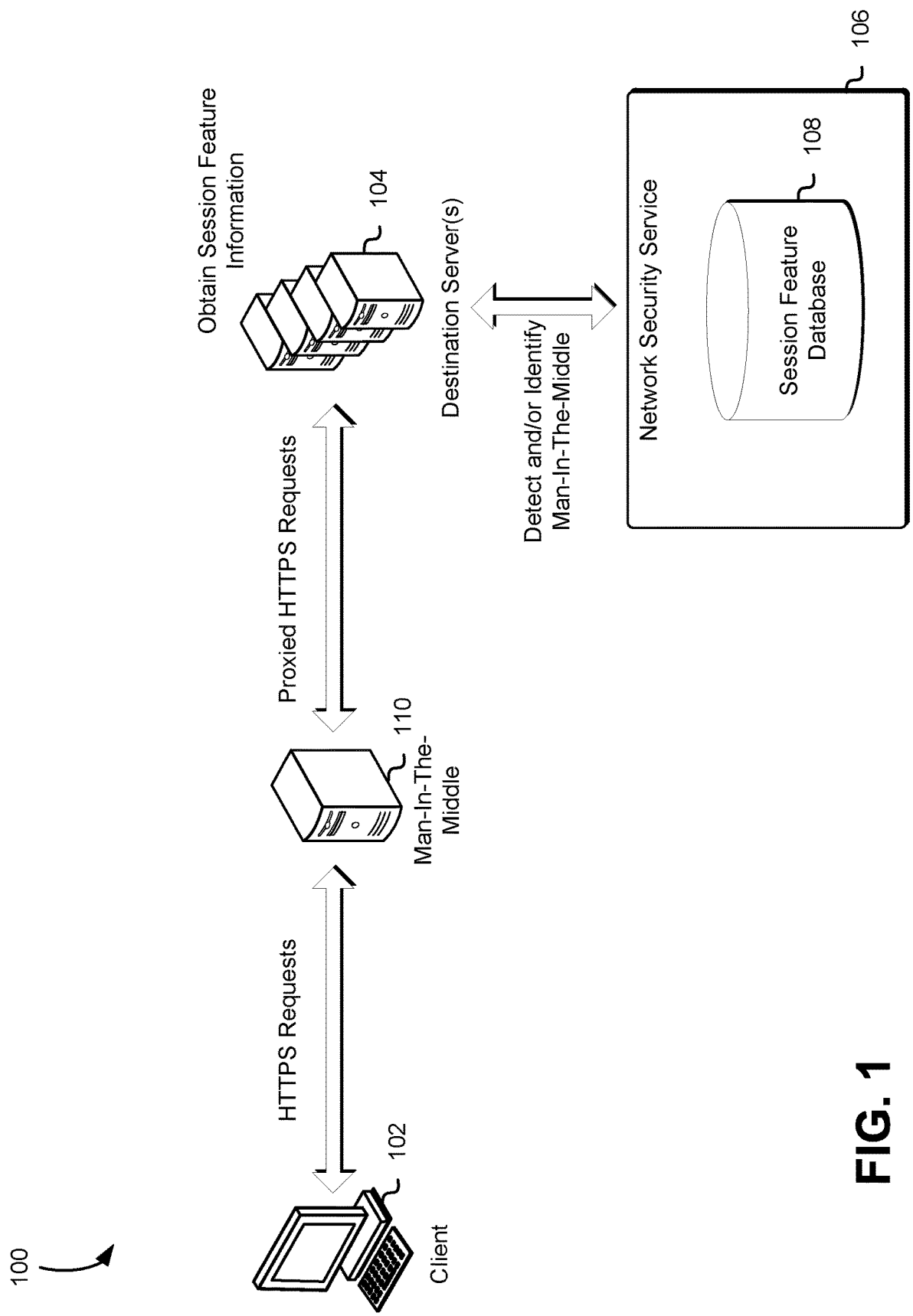
FIG. 1 illustrates an environment in which a network security service can identify an entity intercepting a connection between a client and a destination server in accordance with an embodiment.

In various examples described below, a network security service is used to identify a particular entity intercepting communications between computer systems communicating over a network connection. In one example, a client device communicates with a destination server and negotiates a network connection such as a transport layer security (TLS), secure sockets layer (SSL), hypertext transfer protocol secure (HTTPS), Secure Shell (SSH), or other network connection. Furthermore, the communication to establish the network connection may include session feature information specifying various features and/or attributes of the network connection such as the user-agent and/or application utilized to communicate with the destination server, supported cipher suites, network address, cookies, or any other information that may be negotiated to establish a network connection. As described in greater detail below, this information may be used by the network security service to detect intermediaries between parties to the network connection (e.g., man-in-the-middle (MITM)) and/or determine the identity of any intermediaries between parties to the network connection.

In one example, a client establishes a TLS connection with a destination server. The destination server then provides the TLS session feature information to the network security service and the network security service detects and identifies any MITM that is breaking the TLS connection. As described in greater detail below, the network security service can identify both malicious intermediaries and legitimate and/or intendent intermediaries. For example, an intendent intermediary includes a corporate proxy while a malicious intermediary includes an attacker eavesdropping on a network connection. In either situation, the network security service may detect a MITM based at least in part upon analyzing the session feature information (e.g., negotiated parameters of a TLS connection) of the connection at multiple levels of the relevant network framework (e.g., the Open System Interconnection (OSI) model). In one example, the combination and ordering of Layer 6 (TLS) and Layer 7 (hypertext transfer protocol (HTTP)) connection parameters can be analyzed to determine whether the parameters correspond to known identities of a MITM.

In some implementations, the network security service is provided by a computing resource service provider that provides customers with computing resources the customers use to implement destination servers and other end points that may be a party to a network connection. In such embodiments, the network security service obtains connection information (e.g., session feature information) from a plurality of network connections. In one example, network logs are collected by the network security service and the session feature information is analyzed to determine the identity of various MITMs and/or types of MITMs. Specific MITMs may use specific session features (e.g., negotiated parameters) when establishing a network connection such as a TLS connection. For example, a particular type of corporate proxy uses a specific combination of session features such as a particular version of a cipher suite, a particular user-agent, and particular operating system environment. As a result, the network security service can identify the particular corporate proxy by analyzing the session feature information obtained from a destination server and matching the portion of the session feature information with the known session features of the particular corporate proxy.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which a network security service can identify an entity intercepting a connection between a client and a destination server in accordance with an embodiment. In an embodiment depicted by the environment 100, a client 102 submits an application layer (e.g., HTTPS, file transfer protocol, etc.) request to a destination server 104 (e.g., network server) to establish a secure network communications channel, such as a TLS/SSL secure channel. In various embodiments, the client 102 includes a computer system, laptop, mobile device, tablet, smart phone, server computer system, or other devices executing one or more applications that access and/or communicate with an application (e.g., service) made available through a destination server 104. The client 102 may communicate with the destination server 104 through one or more communications networks, such as the Internet. The application layer request from the client 102 may include a variety of informational fields, such as a user-agent field, a cipher suite, network information, or cookies, which may be provided, by the destination server 104, to a network security service 106 to detect and/or determine the presence and/or identity of various intermediaries to the secure network communications channel such as the man-in-the-middle (MITM) 110 illustrated in FIG. 1.

In various embodiments, the attributes and/or parameters of the secure network communications channel, client 102, and/or destination server 104 are provided as session feature information, as described in greater detail below, and provided to the network security service 106. For instance, the user-agent field comprises information provided by the client 102 to the destination server 104 during establishment of the secure network communications channel, the user-agent field specifies a browser application (e.g., Internet Explorer®, Firefox®, Chrome®, etc.) used by client 102 to communicate with the destination server 104. Additionally, the client 102 may specify, for the secure network communications channel to be established, negotiable features (e.g., cipher suites, cookies, etc.) that may be utilized by the destination server 104 to communicate with the client 102 through the secure communications channel. While user-agents, cipher suites, cookies, network information, and other examples are used extensively throughout the present disclosure for the purpose of illustration, other information relating to the client 102, the destination server 104, and the communications channel, including other attributes of the client 102 and other features may be used in connection with the present disclosure.

In an embodiment, the destination server 104 is a web server that provides web pages viewable through a browser application. In another embodiment, the destination server 104 is a file server that enables clients 102 to access one or more files remotely through the secure communications channel. In yet another embodiment, the destination server 104 is a web service frontend that provides clients 102 with an interface through which the clients 102 communicate with one or more services provided by a computing resource service provider. Generally, the destination server 104 may be any server computer system capable of establishing a secure communications channel and implementing various techniques described herein. In some embodiments, the destination server 104 provides the received user-agent field and corresponding negotiable features from the client 102 to the network security service 106, and determines the presence and identity of the MITM 110. The MITM 110 may include a variety of computing resources that intercept, relay, or otherwise proxy network traffic of a cryptographically protected communications session between the client 102 and the destination server 104. For the purposes of the present disclosure, any computing device that intercepts or otherwise obtains network traffic from the client 102 and transmits the network traffic to the destination server 104 may be considered an MITM 110. For example, a proxy device that obtains network traffic from the client 102 and transmits the network traffic to the destination server 104, with or without modification of the network traffic, is a MITM relative to the communications between the client 102 and the destination server 104.

The network security service 106 may be provided as a service by the computing resource service provider where the network security service 106 provides analysis of session feature information based at least in part on information included in a session feature database 108. For example, the destination server 104 transmits the received session feature information (e.g., user-agent field and corresponding negotiable features) to the network security service 106 for analysis. The network security service 106 analyzes the session feature information, as described in greater detail below, by at least identifying session feature information modified or otherwise associated with the MITM 110 and determining an identity of the MITM 110 based at least in part on matching the identified session feature information with information included in the session feature database 108.

As described above, the network security service 106 may include or otherwise have access to (i.e., be able to cause queries to be executed against the session feature database 108, which includes MITM entries for identified MITMs and, for each MITM entry, one or more session features associated with the MITM identified by the particular MITM entry. In an embodiment, the network security service 106 utilizes a request log to identify session features (e.g., user-agent/cipher suite) of network communications sessions over a particular interval of time to identify particular MITMs. Based at least in part on these identified session features of particular MITMs, the network security service 106 may develop a confidence score for identified MITMs. In one embodiment, the score is generated using a heuristic that is a weighted sum of matching session features, where different session features can be assigned different weights. A confidence score relative to a threshold may indicate a match between the session features and the MITM 110 or particular type of MITM 110. In another embodiment, the session features are used as an input to a statistical model, such as a random forest, where the output indicates one or more MITMs or types of MITMs that are the closest match and/or confidence for the match. The confidence score may be based at least in part on a number of session features matched from the session feature database 108 for a particular set of session features obtained from the destinations.

As described in greater detail below, the network security service 106 may provide the confidence score to the destination server 104 or other endpoint such as a customer of the computing resource service provider. If the confidence score is within a certain value relative to a threshold, the destination server 104 may perform various security measures. In one example, the destination server 104 terminates the communications session with the client 102. In another example, the destination server 104 or other computer system flags the communications session for review by a security engineer. In various embodiments, the network security service 106 is integrated with the destination server 104 and therefore may perform various operations on behalf of or without action by the destination server 104. For example, if the MITM 110 identified by the network security service 106 is associated with a malicious entity and/or attacker, the network security service 106 then terminates the communications session without an operation by the destination server 104. Additionally, or alternatively, the destination server 104 and/or network security service 106 may block any further incoming transmissions originating from an Internet Protocol (IP) address associated with the client 102 and/or MITM 110.

In various embodiments, the network security service 106 is a component of another service, such as a networking service or load balancing service provided by the computing resources service provider. In such embodiments, the network security service 106 or a component of the network security service 106, such as an agent (not illustrated in FIG. 1 for simplicity), may be executed by the destination server 104.

In some embodiments, the network security service 106 is accessible to both the client 102 and the destination server 104. For instance, the network security service 106 may be made available to various customers, enabling these customers to utilize clients 102 to access the network security service 106 and verify any incoming network traffic. For example, as part of the TLS/SSL secure channel handshake process, the destination server 104 may transmit its own session feature information (e.g., negotiable parameters) to the client 102. In response, the client 102 may transmit this session feature information to the network security service 106 for analysis, detection of the MITM 110, and/or identification of the MITM 110.

Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6066, RFC 6083, RFC 6091, RFC 6176, RFC 6209, RFC 6347, RFC 6367, RFC 6460, RFC 6655, RFC 7027, and RFC 7366 which are incorporated herein by reference, to establish encrypted communications sessions. Other protocols implemented below the application layer of the OSI model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, Internet Protocol Security (e.g., as defined in RFC 1825 through 1829, RFC 2401, RFC 2412, RFC 4301, RFC 4309, and RFC 4303) and other protocols, such as protocols for secure communication that include a handshake.

As noted that above, in some embodiments, the network security service 106 is not a separate entity but rather is incorporated into (e.g., executed by) the destination server 104 or client 102 as an integrated component. For instance, when the destination server 104 receives the session feature information from the client 102, the destination server 104 may utilize the network security service 106 or component thereof to detect and/or identify the MITM 110. The session feature database 108 may also be included within the destination server 104. In addition, the network security service 106, whether integrated with the destination server 104 or not, may modify properties of the secure communications channel. In one example, the network security service 106 modifies a webpage and/or web content transmitted between the client 102 and the destination server 104 to indicate the presence of the MITM 110. As described above, the network security service 106 may perform this on behalf of the destination server 104 and indicate to the client 102 of the presence and/or identity of the MITM 110. In various embodiments, this information enables the client 102 to determine whether to terminate the connection.

Figure 2:
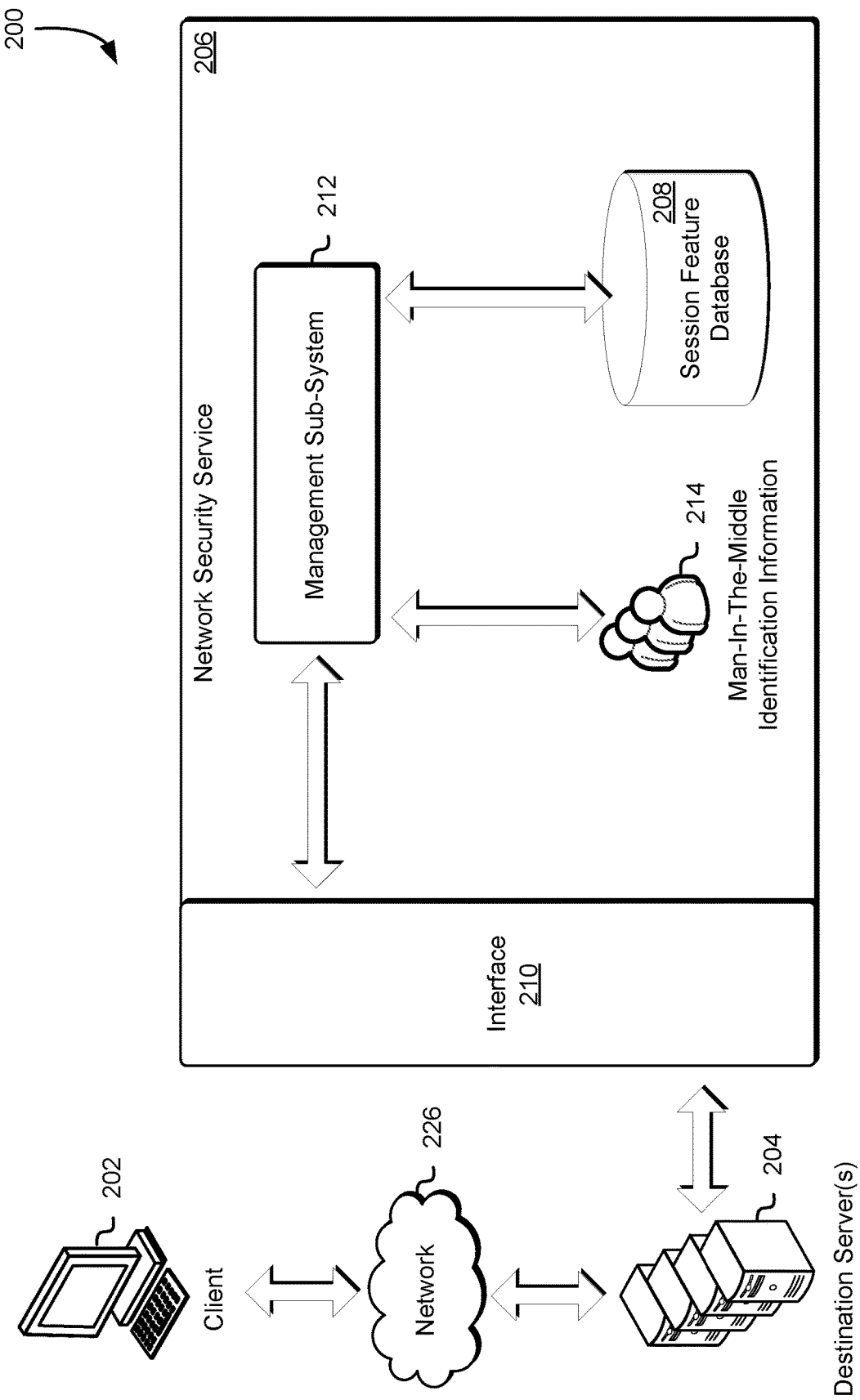
FIG. 2 illustrates an environment in which a network security service is used to identify an entity intercepting a connection between a client and a destination server in accordance with an embodiment.

FIG. 2 illustrates an environment 200 in which a destination server 204 interacts with a network security service 206 comprising various components to detect and/or identify intermediaries which may be intercepting traffic over a connection between a client 202 and the destination server 204 in accordance with at least one embodiment. As described above in connection with FIG. 1, the destination server 204 may provide accessibility to content to users over a communications network 226, such as the Internet. In one example, the destination server 204 is a web server that provides various web pages to users through a browser application or other suitable application. Alternatively, the destination server 204 may be a file server allowing users to access the destination server 204 to obtain files provided by the destination server 204.

In an embodiment, to access the destination server 204, a client 202 may submit a HTTPS request through the communications network 226 to the destination server 204 to establish a secure communications channel for transmitting encrypted data. As described in the present disclosure, various intermediaries may intercept communications directed to either end of the communications channel, decrypt the encrypted data, and re-encrypt and retransmit the data to the other end of the communications channel. Furthermore, the HTTPS request may include session feature information such as a user-agent header specifying the one or more applications utilized by the user of the client 202 to access the destination server 204 and cipher suite information specifying encrypting algorithms used to secure the communications channel. For instance, if the user of the client 202 has utilized a browser application (e.g., Chrome®, etc.) to access the destination server 204, the user-agent header may specify this particular browser application. In addition, if the client 202 is capable of implementing version 4 of TSL, this information may be included in the session feature information so the client 202 and destination server 204 can negotiate the secure communications channel. Intermediaries may cause modification or changes to connection information. Furthermore, these intermediaries may have particular combinations of connection features (e.g., particular cipher suites, cookies, information ordering, etc.) that can be used as MITM identification information 214 as described in greater detail below.

In addition, the specified one or more cipher suites may be specific to the particular browser application specified within the user-agent header provided by the client 202 which may be different from one or more cipher suites supported by a particular intermediary. The destination server 204 may select a cipher suite from the specified one or more cipher suites to perform the TLS/SSL handshake for the secure communications channel. However, prior to doing so, the destination server 204 may communicate with a network security service 206, such as through one or more application programming interface (API) calls to the service, to request analysis of the provided session feature information from the client 202.

The network security service 206 may include an interface 210, which may enable the destination server 204, administrators of the destination server 204 and other users to access the network security service 206. For instance, the interface 210 may include a graphical user interface (GUI), described in greater detail below in connection with FIG. 4, that enables an administrator of the destination server 204 to provide the network security service 206 with the session feature information. Alternatively, the destination server 204 may be configured to utilize the interface 210 through one or more automated processes to provide the session feature information to the network security service 206.

As illustrated in FIG. 2, the network security service 206 includes a management sub-system 212, which receives the session feature information from the interface 210 and processes the session feature information to detect and/or identify intermediaries (e.g., MITM). In various embodiments, the management sub-system 212 may access a session feature database 208 to identify an intermediary associated with at least a portion of the session feature information. For example, the session feature database 208 may include an entry for particular session features (e.g., cookies or cipher suites) associated with intermediaries detected by the network security service 206, either through information obtained from the destination server 204 or through other analytical means (e.g., offline testing of various browser applications in a controlled environment, etc.).

Put another way, for any particular session feature; such as a particular version of TLS and/or SSL, the session feature database 208 may include an entry that identifies intermediaries known to support that particular session feature. In this manner, if there is a mismatch in the session features between the application layer (layer 7 of the OSI model) and any lower level, the management sub-system 212 may use the session feature database 208 to determine intermediaries that support the mismatched session features from the lower levels. For example, a particular user-agent supports only versions 6 and higher of the TLS protocol, but the session feature information indicates that the connection between the client 202 and the destination server 204 is using TLS version 4. Based at least in part on this information, the management sub-system 212 may search the session feature database 208 to determine intermediaries that support TLS version 4.

In an embodiment, the session feature database 208 includes information keyed on an MITM identifier such as IP address, IP address block, user-agent, cipher suite, cryptographically protected communications protocol (e.g., TLS, SSL, HTTPS, SSH, IPSEC, etc.), version, geolocation, and other information associated with the OSI model. The management sub-system 212 may query the session feature database 208 based at least in part on a portion of the session connection information to detect and/or identify the MITM. For example, the subset of connection features not associated with the client 202 are used to generate a query to determine if there are any known MITM associated with the subset of connection features. The query may be processed with all of the session features, a subset of the session features, or a heuristic that may rank or weight certain features.

Additionally, for a set of session features, MITM identification information 214, such as a MITM identifier, may be generated. For example, for a particular combination of session features (e.g., cipher suite, autonomous agent, etc.) a fingerprint or similar identification information is generated. In such embodiments, the management sub-system 212 compares the session feature information to the MITM identification information 214 to determine if a particular intermediary can be identified. In one example, an organization uses a corporate firewall and controls connections from computer systems within the organization to servers on other networks such as the internet. The corporate firewall may have a particular set of session features that may be identified by the network security service 206 and used to generate MITM identification information 214. As a result, when a client 202 from within the organization attempts to establish a connection with the destination server 204, the management sub-system 212 can identify the corporate firewall based at least in part on the MITM identification information 214.

In an embodiment, the network security service 206 specifies a confidence score for the identification of a particular intermediary and/or the detection of an intermediary. For example, the network security service 206 may be configured to review an HTTPS request log specifying session feature information received over a particular interval of time. The network security service 206 may group particular subsets of session features together with a confidence score and/or confidence interval associated with particular subsets of session features. A higher confidence score may be assigned to a particular subset of session features with a greater incidence of intermediaries over the interval of time. Alternatively, if the particular subset of session features does not have a high incidence rate, the particular subsets of session features may receive a lower confidence score. In yet other embodiments, a lower score indicates a higher likelihood that the particular subset of session features is associated with an intermediary.

Once the management sub-system 212 has identified an intermediary, the management sub-system 212 may determine whether the client 202 and/or destination server 204 should be flagged and/or security measures taken to address a potentially intercepted communications channel. For instance, the management sub-system 212 may be configured to flag a client 202 in the event that the confidence score for the session feature information is within a certain value of a threshold and/or cannot be found within the session feature database 208. In such instances, the management sub-system 212 may trigger a security response (e.g., denial of request, termination of connection with the client 202, etc.). Additionally, the management sub-system 212 may select one or more security applications that may be provided to the destination server 204 to perform additional security measures resulting from the client 202 being flagged. In another example, the network security service 206 includes additional information in an API response to the destination server 204 indicating the identity of the intermediary. In other embodiments, the network security service 206 generates log information indicating the identity of intermediaries and associated confidence scores, which may be reviewed by an administrator associated with the destination server 204.

In various embodiments, the network security service obtains session feature information from a plurality of connections between a plurality of different clients 202 and destination servers 204. This session feature information may be analyzed by the management sub-system 212 and used to generate the session feature database 208 and/or MITM identification information 214 as described in greater detail below in connection with FIG. 7. In addition, testing may be performed to determine particular subsets of session features associated with particular intermediaries. For example, a security engineer performs a test of a particular corporate firewall to determine the set of session features added, removed, and/or modified when the particular corporate firewall is an intermediary of a connection between the client 202 and the destination server 204.

In various embodiments, the destination server 204 is provided with the confidence score, MITM identification information 214, and/or information obtained from the session feature database 208. In other embodiments, the destination server 204 includes an agent or component of the network security service 206 that obtains the confidence score, MITM identification information 214, and/or information obtained from the session feature database 208 from the network security service 206. Furthermore, the agent or component of the network security service 206 executed by the destination server 204 may implement one or more security measures in response to the information obtained from the network security service 206. In one example, if a MITM identifier indicates network traffic of the cryptographically protected communications session is being intercepted by a proxy device (e.g., a MITM) and confidence score is within a value relative to a threshold, an agent executed by the destination server 204 performs a particular security measure, such as terminating the cryptographically protected communications session or modifying the network traffic of the cryptographically protected communications session.

In some embodiments, the destination server 204 includes a library or other software that, when executed by the destination server 204, causes the destination server 204 to transmit session feature information to the network security service 206. In other embodiments, the destination server 204 is implemented using computing resources of the computing resource service provider, such as virtual machines supported by a hypervisor or other virtualization layer of a server computer system. In one example, the destination server 204 is implemented at least in part using a load balancer provided by the computing resource service provider. In such embodiments, the virtualization layer may be responsible for transmitting the session feature information to the network security service 206 and/or performing security measures in response to information obtained from the network security service 206.

Figure 3:
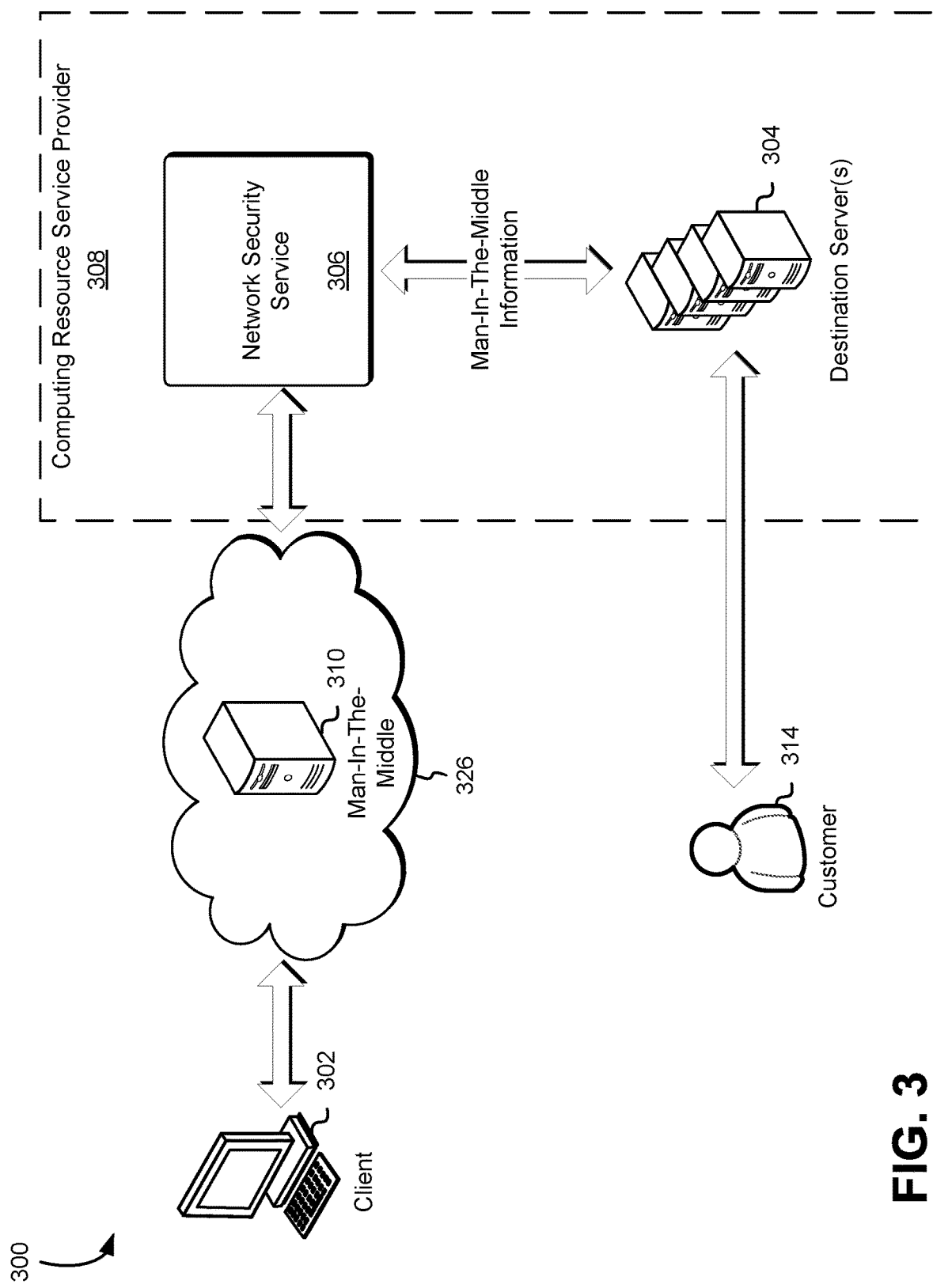
FIG. 3 illustrates an environment in which a network security service can provide identity information associated with an entity intercepting a connection between a client and a destination server to a customer in accordance with an embodiment.

FIG. 3 illustrates an environment 300 in which a network security service 306 can provide identity information associated with an entity intercepting a connection between a client 302 and a destination server 304 to a customer 314 in accordance with an embodiment. As described above in connection with FIGS. 1 and 2, the destination server 304 may provide accessibility to content to users over a communications network 326, such as the Internet, to the client 302. In one example, the destination server 304 is a web server that provides various web pages to users through a browser application or other suitable application. The client 302, in an embodiment, includes a computer system executing the browser application accessing the webpages provided by the destination server 304.

In an embodiment, to access the destination server 304, a client 302 may submit a HTTPS request through the communications network 326 to the destination server 304 to establish a secure communications channel for transmitting encrypted data. As described in the present disclosure, a MITM 310 may intercept communications directed to either end of the communications channel, decrypt the encrypted data, and re-encrypt and retransmit the data to the other end of the communications channel. Furthermore, the HTTPS request may include session feature information such as a user-agent and cipher suite as described above. As illustrated in FIG. 3, the destination servers 304 are provided by a computing resource service provider 308. The computing resource service provider 308, in various embodiments, provides access to computing resources (e.g., server computer systems, virtual machines, storage devices, network applications, etc.) which are used by customers 314 to perform various operations. For example, the customer 314 uses the computing resources of the computing resource service provider 308 to operate the destination servers 304.

In addition, the computing resource service provider 308 provides the network security service 306 to the customers 314. Although not illustrated in FIG. 3 for simplicity, the computing resource service provider 308 may operate a proxy or similar network device to receive communications from the network 326 directed to an endpoint within the computing resources service provider environment (e.g., the destination server 304) and direct the communications to the endpoint within the computing resource service provider environment. Furthermore, as illustrated in FIG. 3, the computing resource service provider 308 can route communications (e.g., network traffic) through the network security service 306. In this manner, the network security service 306 can detect and identify the MITM 310 without the destination server 304 providing the network security service 306 with the session feature information. Similarly, in the embodiment illustrated in FIG. 3, the network security service 306 may modify attributes of the communication between the client 302 and the destination server 304 by virtue of the network security service 306 being between the connection from the client 302 to the destination server 304.

In one example, the network security service 306 modifies the webpages transmitted from the destination server 304 to the client 302 such that the webpage indicates the presence and/or identity of the MITM 310. In various other embodiments, the network security service 306 generates MITM information (e.g., session features, identification information, confidence score, etc.) and provides the MITM information to the destination server 304 and/or other endpoints such as the customer 314. In such embodiments, the destination server 304 may make a determination and perform security measures based at least in part on the MITM information. In one example, the MITM information includes a log containing information associated with connections to the destination server 304 and detected and/or identified MITMs over an interval of time. As described in greater detail below, the customer 314 may indicate and/or modify the operation of the network security service 306. In one example, the customer 314 indicates to the network security service 306 to terminate any connection between the client 302 and the destination server 304, which the network security service 306 determines with a particular confidence score relative to a threshold value, is being intercepted by an unidentified MITM 310 or a known malicious MITM 310.

In another example, network security service 306 provides the destination server 304 with the MITM information and the destination server 304 determines security measures to perform based at least in part on the MITM information. In one embodiment, the destination server 304 modifies a webpage transmitted to the client 302 to not display a log in screen or otherwise prevents the client 302 to access restricted computing resources of the destination server 304. In another embodiment, the destination server 304 removes or otherwise does not cause sensitive information to be displayed in a webpage transmitted to the client over the session. As described in the present disclosure, the destination server 304 and/or the network security service 306 may perform a variety of different security measures based at least in part on the MITM information.

Figure 4:
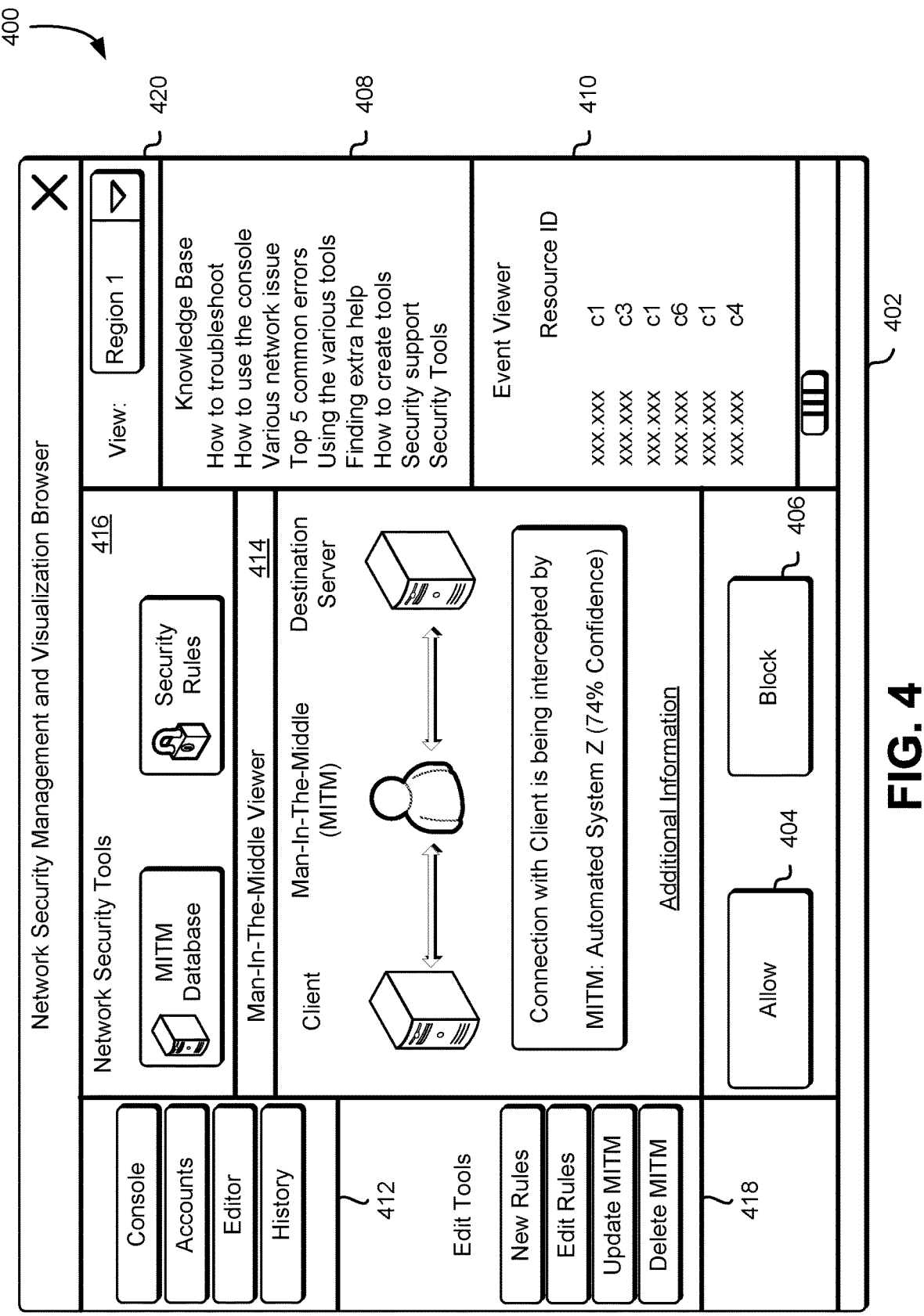
FIG. 4 is a diagram illustrating a management console implemented as a webpage for visualizing information associated with an entity intercepting a connection between a client and a destination server in accordance with at least one embodiment.

FIG. 4 illustrates an example environment 400 where a network security management and visualization browser 402 may be used to detect and/or identify intermediaries to a secure network communications channel as well as modifying the behavior of a network security service performing the detection and/or identification of the intermediaries as described in the present disclosure at least as described above in connection with FIGS. 1 and 2 and in accordance with at least one embodiment. The network security management and visualization browser 402 enables a customer to detect MITMs to secure network connections, identify particular MITMs or types of MITMs, modify the operation of the network security service, troubleshoot issues associated with secure network connections, receive recommendations associated with network architecture, search a knowledge base for information related to particular MITMs, and generally detect and identify MITMs and manage the network security service. In various embodiments, the network security management and visualization browser 402 is a computer system service such as a web service and provided by the network security service of the computing resource service provider as described in the present disclosure.

As illustrated in FIG. 4, the network security management and visualization browser 402 is provided as a user interface executed by an application, such as a web browser executing on a computer system operated by the customer, as well as other user interfaces that may be used to present MITM information and connection information to the customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The computing resource service provider may receive the selection information from the customer's computing device and provide the information to other computing resources of the network security service. For example as illustrated in FIG. 4, the customer is presented with connection information about a particular secure network communications channel in a display pane labeled as the "Man-In-The-Middle Viewer" 414. The display pane may include any of the information described in the present disclosure, including a visualization of the secure network communications channel, detecting of a MITM, an identity or type information associated with the MITM, and a confidence score associated with the identification of the MITM. The user interface may be generated or caused to be generated by the network security service as described in the present disclosure. Furthermore, as illustrated in FIG. 4, the network security management and visualization browser 402 may include an "Allow" button 404 and a "Block" button 406 to enable the customer to perform an action associated with the detected MITM as described in greater detail below.

The network security management and visualization browser 402 may include network security tools 416 that aid the customer in generating and/or establishing network security settings for the network security service and/or visualization thereof in the network security management and visualization browser 402. For example, the network security tools 416 may include a graphical user interface element, such as the buttons illustrated in FIG. 4, where selection of the graphical user interface element may cause the network security service to display information to the customer to aid the customer in establishing rules for identified MITM or mitigation operations associated with a particular MITM or type of MITM including a threshold value associated with a confidence score generated by the network security service. For example, selection of the "Security Rules" button causes the information to be displayed in the display pane of the network security management and visualization browser 402 that guides the customer through a process of establishing security rules (e.g., if a MITM is detected with an 80% confidence score a particular mitigation operation). Based at least in part on the information displayed, the customer may modify the behavior of the network security service.

In yet other embodiments, the network security service may detect an intermediary intercepting and modifying information transmitted along a network connection between a client and destination server as described above. In such embodiments, Man-In-The-Middle 414 display pane of the network security management and visualization browser 402 displays information about the MITM and the network connection. As illustrated in FIG. 4, the network security management and visualization browser 402 includes an allow button 404 and a block button 406. Selection by the customer of the allow button 404 may cause the underlying code executing the network security management and visualization browser 402 to transmit information to the network security service to allow continued communication along the network connection indicated in the display pane.

Selection of the block button 406 may cause the underlying code executing the network security management and visualization browser 402 to terminate the connection between the client and the destination service. Although not illustrated in FIG. 4 for simplicity, the customer may be provided with any of the options and/or mitigation operations described in the present disclosure. For example, the customer is provided the option to log information associated with the network connection and MITM. In addition, as illustrated in FIG. 4, the customer has the option to view additional information associated with the MITM and network connection through an "Additional Information" link. Selection of the additional information link may cause the underlying code executing the network security management and visualization browser 402 to display information associated with the information in the display pane, such as the set of session features that were used to identify the MITM.

As illustrated in FIG. 4, the network security management and visualization browser 402 further includes a set of options 412 used to perform various functions in connection with the network security management and visualization browser 402. The set of options 412 may be a set of functions included in the network security management and visualization browser 402 that enables a customer to perform a variety of operations such as managing accounts, creating network security components, creating security rules, and managing customer-operated computing resources. The options 412 may be configured as graphical user interface elements of the network security management and visualization browser 402.

The account button may be configured to enable the customer to select particular customer accounts to perform various operations associated with a particular service in connection with the selected customer accounts. In various embodiments, the customer operating the network security management and visualization browser 402 is required to have, at the minimum, complete read permissions across all of the customer services and computing resources associated with the accounts for which the customer is attempting to perform operations associated with the particular service. The editor button may be configured to enable the customer to create or edit the operation of the destination server and/or network security components (e.g., an agent of the network security service executing on the destination server to provide detection and identification of MITMs).

In various embodiments, the customer is provided with resources to aid in determining what MITMs may be malicious, what secure network communications channels may be at risk, and/or secure network communications channels may require attention. In addition, security information, MITM information, and other information may be saved in such a manner that the information is accessible to all customer accounts and/or all other customers of the computing resource service provider. The network security management and visualization browser 402 may further include an event viewer 410. The event viewer may be configured to provide information related to anomalous or other events detected during the operation of the network security service. This information may provide a set of data associated with systemic, operational, or maintenance events associated with a destination server along with schedules and remediation suggestions. For example, the event may include information indicating a secure network communications channel has been compromised by a MITM.

The information displayed in the event viewer 410 may be generated automatically or in response to a request and/or operation of the customer. The network security management and visualization browser 402 may also include a knowledge base 408 that includes articles and provides access to curated content based at least in part on the information collected from customers of the computing resource service provider or generated by the computing resource service provider. The knowledge base may include suggestions on network security and/or configurations of destination servers for specific computing resources or suggest relevant MITM information. In addition, the network security service may suggest or recommend particular knowledge-based articles based at least in part on operational information obtained by the network security service.

The customer may use editing tools 418 to edit, create, or modify existing security rules for particular types of MITMs. For example, the customer may use the editing tools 418 to edit a security rule associated with a corporate firewall. Once a customer has established a connection to the network security service through the network security management and visualization browser 402, the network security management and visualization browser 402 may automatically populate the customer's display with the information in various components of the network security management and visualization browser 402, such as the event viewer 410 and knowledge base 408.

An operation enabled by the network security management and visualization browser 402 includes a view of different regions from a drop down menu 420. The different regions may include different geographical regions or different logical regions within the same or different geographical regions. For example, different regions may include two or more separate virtual networks. Customers may navigate to a particular group using a graphical user interface element as illustrated in FIG. 4. Selection of a particular region may limit the information and generate views of information specific to the region.

In addition, the customer may utilize the network security management and visualization browser 402 to set up the network security service for particular destination servers or other computing resources. In one example, the customer, through interactions with the network security management and visualization browser 402, causes computing resources implementing the network security management and visualization browser 402 to generate API calls, service calls, or requests to the network security service and/or the destination server to establish and/or modify detection and mitigation of MITMs. In various embodiments, the destination server executes an agent or other executable code to provide session feature information to the network security service and process network security information obtained from the network security service.

Figure 5:
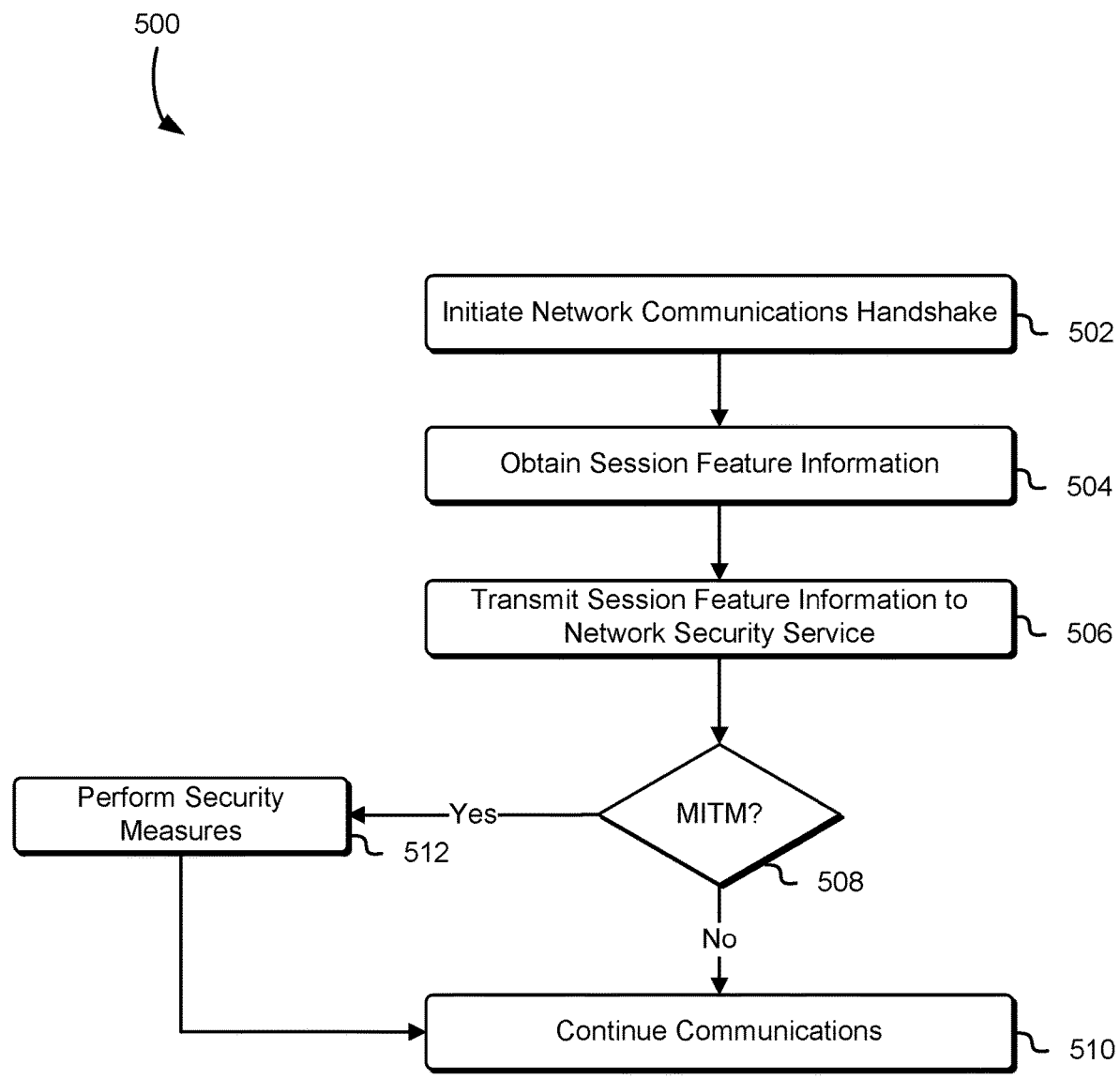
FIG. 5 is a block diagram illustrating a process for using a network service to identify an entity intercepting a connection between a client and a destination server in accordance with an embodiment.

FIG. 5 is a block diagram illustrating an example of a process 500 for detecting an intermediary along the path of a network connection between a destination server and a client in accordance with at least one embodiment. Some or all of the process 500 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 500 may be performed by any suitable system, such as a server in a data center, by various components of the environment 100 described in conjunction with FIG. 1, such as a destination server, by multiple computing devices in a distributed system of a computing resource service provider or by a service provided by a computing resource service provider. The process 500 includes a series of operations which result in detecting a MITM. For example, the process 500 includes initiating a network communications handshake 502. As described in greater detail above, when a client submits, via a browser application, an HTTPS request to establish a secure communications channel with a destination server, the destination server may initiate a network communications handshake with the client. For example, the client specifies, through the HTTPS request, that communications between the client and the destination server should be performed through a secure communications channel; the destination server may respond by initiating a TLS/SSL channel handshake procedure and receive information from the client necessary to authenticate the client. In various embodiments, for TLS/SSL channels, the client may transmit along with the HTTPS request session feature information, which the destination server may utilize to communicate with the user client through the secure channel that is to be established.

In step 504, the destination server obtains the session feature information. As described above, the session feature information may include a variety of parameters and other information included at various levels of the OSI model. For example, the session features include a user-agent as indicated by the client and a set of cipher suites supported by a corporate firewall intercepting and modifying traffic between the client and the destination server. In step 506, the destination server transmits the session feature information to the network security service. The network security service may be a service of the computing resource service provider, provided to the destination server to enable detection and identification of MITM as described above. The session feature information may be transmitted over a network operated by the computing resource service provider and/or one or more intermediary networks such as the Internet.

In step 508, the destination server obtains information from the network security service indicating the presence and/or identity of a MITM. As described above, the network security service may provide this information in a response to an API call, in a log, in a modified header of network traffic between the client and the destination server, or other means of notifying the customer and/or destination server. If the information indicates a MITM, the destination server performs security measures 512. The security measure may include any of the security measures and/or mitigation operations described above, such as terminating the connection, causing information to be displayed in the browser application of the client, flagging the connection for inspection by a security engineer, transmitting a notification, or other security measures. However, if no MITM is detected by the network security service, the destination server continues the network communications 510. In addition, various security measures, such as flagging the connection for inspection by a security engineer, may cause the destination server to continue the network communications.

Note that one or more of the operations performed in 502-510 may be performed in various orders and combinations, including in parallel. For example, the system executing the process 500 may perform the security measures along with continuing the network communications in parallel with each other. In numerous variations to the process 500, one or more of the operations 502-510 may be omitted or performed by other systems of services.

Figure 6:
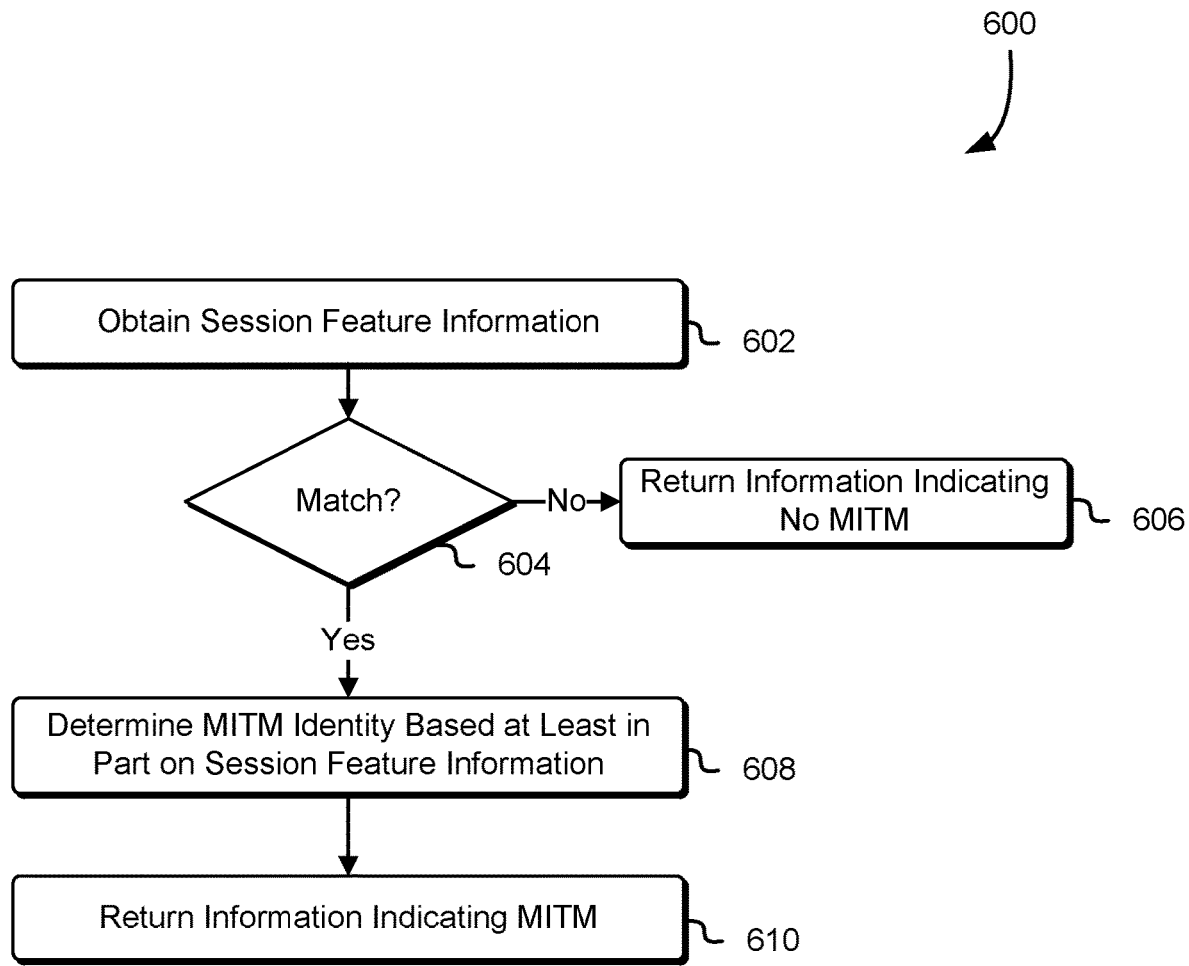
FIG. 6 is a block diagram illustrating a process for identifying an entity intercepting a connection between a client and a destination server in accordance with an embodiment.

FIG. 6 is a block diagram illustrating an example of a process 600 for detecting an intermediary along the path of a network connection between a destination server and a client in accordance with at least one embodiment. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 600 may be performed by any suitable system, such as a server in a data center, by various components of the environment 200 described in conjunction with FIG. 2, such as a network security service, by multiple computing devices in a distributed system of a computing resource service provider or by a service provided by a computing resource service provider. The process 600 includes a series of operations which result in detecting a MITM. For example, the process 600 includes obtaining connection information 602. As described above, the network security service may obtain the session feature information for a particular secure network communications channel for a destination server responsible for performing the TLS/SLL handshake operation with a client. In yet other embodiments, a component of the network security service may be integrated with the destination server and provide the session feature information to the network security service.

In step 604, the network security service determines whether the session feature information or a portion thereof matches or otherwise indicates a MITM. For example, as described above, the network security service maintains MITM identification information and/or a session feature database. The network security service, in an embodiment, compares the obtained session feature information to information maintained in the session feature database to determine if one or more of the session features included in the obtained session feature information match session features included in the session feature database that are associated with the MITM. Furthermore, as described above, based at least in part on any determined matches, the network security service may calculate a confidence score associated with the detection and/or identification of the MITM. In addition, techniques for detecting the presence of MITM in a cryptographically protected communications session are described in *The Security Impact of HTTPS Interception* by Durumeric, Halderman, et al. in Network and Distributed System Security Symposium 2017 hereby incorporated by reference into the specification.

In step 606, if no match is detected, the network security service returns information indicating that there is no detected MITM associated with a particular secure network communications channel. However, in step 608, if a match is detected, the network security service determines the MITM identity based at least in part on the session feature information. For example, as described above, the network security service maintains MITM identification information which indicates a particular MITM or type of MITM based at least in part on a particular set of session features. In yet other embodiments, the network security service determines the identity of the MITM based at least in part on MITM associated with the session features matched from the session feature information. In addition, when matching or otherwise determining the presence and/or identity of the MITM, the network security service may remove from the session feature information a subset of the session features associated with the client and/or destination server. In this manner, the network security service may only evaluate the session features added, removed, or modified by a MITM.

In step 610, the network security service returns information indicating the MITM. As described above, the network security service may provide an indication of the identity of the MITM and a confidence score associated with the identification. This information may be provided in a variety of ways as described in the present disclosure. In addition, this information may be provided to the destination server, a customer associated with the destination server, and/or the client. Note that one or more of the operations performed in 602-610 may be performed in various orders and combinations, including in parallel. For example, the system executing the process 600 may determine a match and identity of the MITM in parallel with each other. In numerous variations to the process 600, one or more of the operations 602-610 may be omitted or performed by other systems or services.

Figure 7:
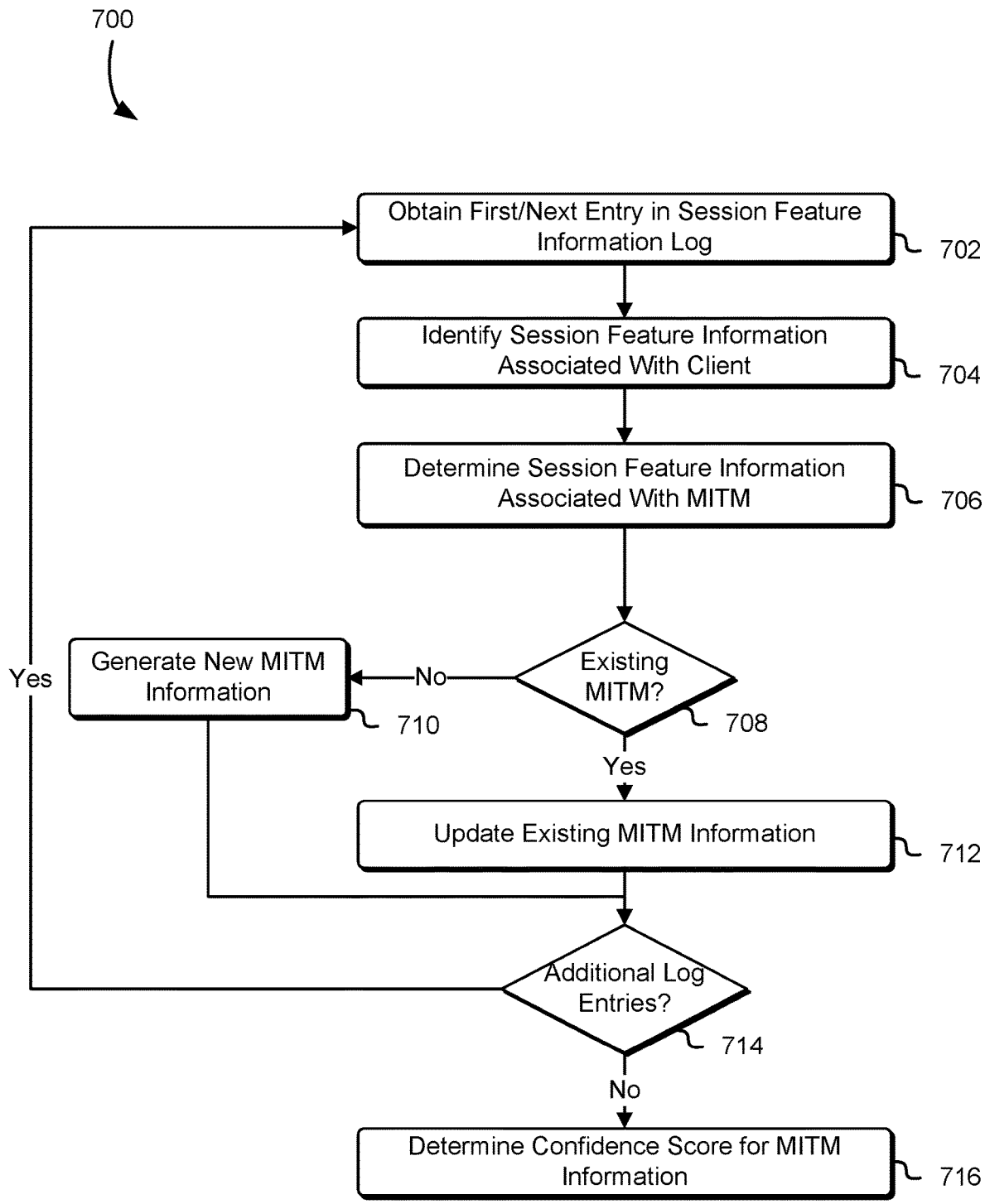
FIG. 7 is a block diagram illustrating a process for generating identification information that may be used to identify an entity intercepting a connection between a client and a destination server in accordance with an embodiment.

FIG. 7 is a block diagram illustrating an example of a process 700 for generating information suitable for detecting an intermediary along the path of a network connection between a destination server and a client in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 200 described in conjunction with FIG. 2, such as a network security service, by multiple computing devices in a distributed system of a computing resource service provider or by a service provided by a computing resource service provider. The process 700 includes a series of operations which result in information suitable for detecting a MITM. For example, the process 700 includes obtaining first/next session feature information entry in a log of session feature information 702. As described above, a log may be generated including information obtained from a plurality of computer systems party to a secure network communication channel. This information as described in greater detail below, may be used to generate information which may be used by the network security service to detect and/or identify MITMs. This information, in various embodiments, is aggregated from a plurality of destination servers operated by one or more customers and provided by a computing resource service provider.

In step 704, the network security service identifies session feature information associated with the client. As described above, this information may be included in a particular level of the OSI model or may be determined based at least in part on information associated with the client such as known capabilities of the user-agent. In step 706, the network security service may determine session feature information associated with a potential MITM. In various embodiments, the network security service masks out the session features associated with the client and evaluates the remaining session features as potentially associated with a MITM. In yet other embodiments, the network security service determines session features that have been modified, added, or removed to determine session feature information potentially associated with a MITM.

In step 708, the network security service determines if the session feature information associated with the MITM matches existing information for a known MITM. If the network security service does not detect existing MITM information, in step 710, the network security service generates new MITM information. For example, the network security service generates a set of session features that identify a MITM and/or particular type of MITM. This information may include MITM identification information as described above in connection with FIG. 2. If network security service does detect existing MITM information, in step 712, the network security service may update existing MITM information. For example, the network security service updates a confidence score associated with MITM identification information. In another example, the network security service updates an entry in a session feature database as described above in connection with FIG. 2.

In step 714, if additional entries are included in the log, the network security service returns to step 702 and continues the process 700. However, if there are not additional log entries, the network security service continues to step 716. In step 716, the network security service determines a confidence score for MITM information. In some embodiments, the network security service may only determine a confidence score for MITM information that does not have an existing confidence score. The confidence score may be determined as described above and may be based at least in part on session feature information.

Note that one or more of the operations performed in 702-716 may be performed in various orders and combinations, including in parallel. For example, the system executing the process 700 may evaluate multiple entries of the log in parallel with each other. In numerous variations to the process 700, one or more of the operations 702-710 may be omitted or performed by other systems of services.

Figure 8:
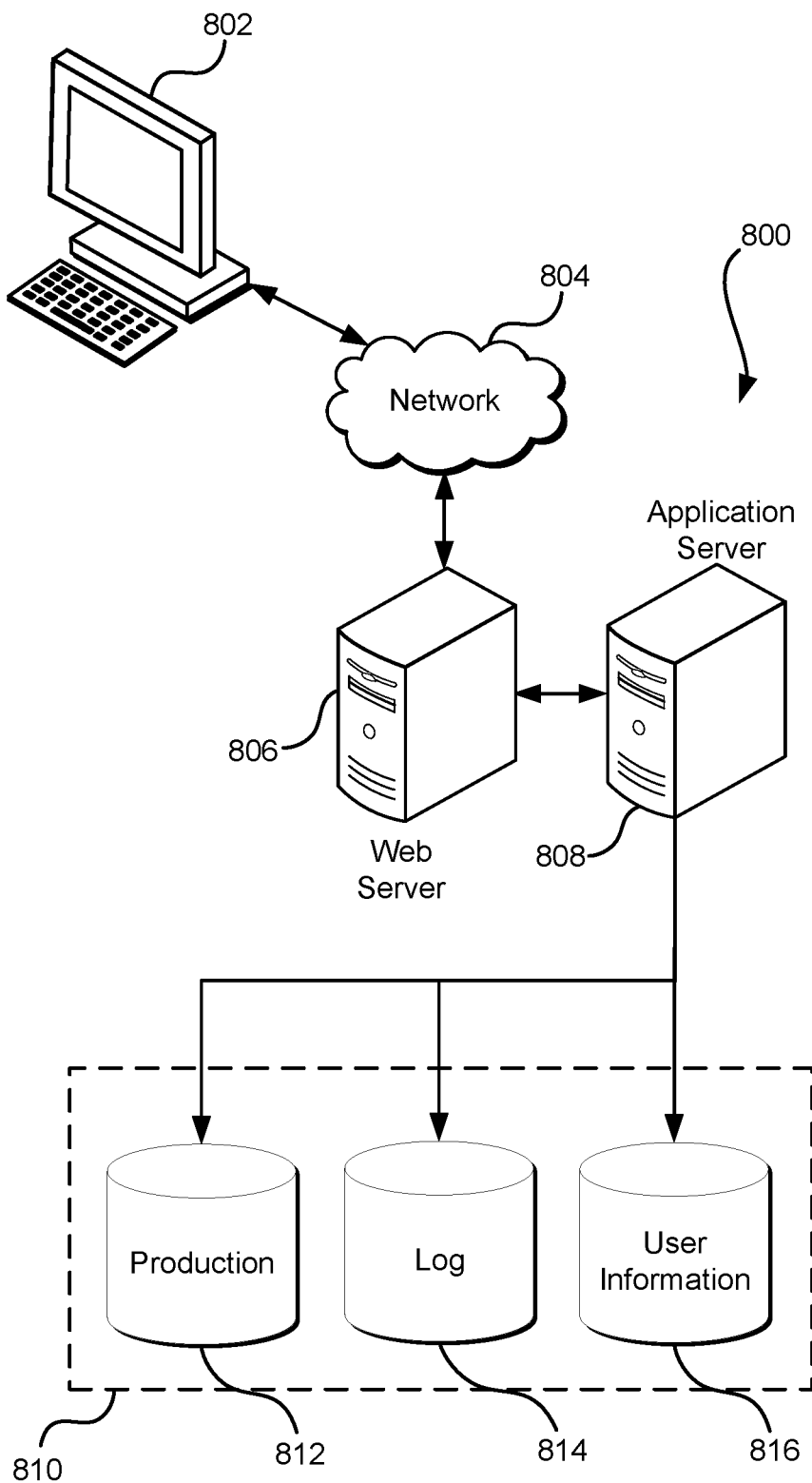
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase °, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, at a network security service for detecting intermediaries to a network connection and provided by a computing resource service provider, a set of network logs containing session feature information for a plurality of cryptographically protected communications sessions where at least two cryptographically protected communications sessions of the plurality of cryptographically protected communications sessions have been established between distinct client devices and distinct destination servers using computing resources of the computing resource service provider and the session feature information includes at least a set of negotiated parameters between the distinct client devices and the distinct destination servers, the set of network logs recording information about a first cryptographically protected communications session;
    determining a set of features of the first cryptographically protected communications session, the set of features including at least a subset of the set of negotiated parameters;
    determining a subset of features of the set of features by at least excluding features of the set of features associated with a client that is associated with the first cryptographically protected communications session based at least in part on a set of capabilities associated with a user-agent executed by the client, the subset of features corresponding to a type of man-in-the-middle (MITM) present in the first cryptographically protected communications session of the plurality of cryptographically protected communications sessions;
    adding the subset of features to a database associated with an identifier corresponding to the type of MITM as a result of the subset of features not matching one or more other subsets of features included in the database and associated with other types of MITM;
    obtaining, from a destination server operated by a customer of the computing resource service provider, a second set of negotiated parameters associated with a second cryptographically protected communications session, where the destination server is participating in the second cryptographically protected communications session;
    detecting a presence of the type of MITM based at least in part on the second set of negotiated parameters from the second cryptographically protected communications session and the identifier by at least comparing removing from a first subset of negotiated parameters of the second set of negotiated parameters associated with the client and destination server to generate a second subset of negotiated parameters of the second set of negotiated parameters added, removed, or modified by the type of MITM and comparing the second subset of negotiated parameters to the subset of the set of features based at least in part on information maintained in the database;

determining a confidence score associated with the type of MITM based at least in part on a first number of the second subset of negotiated parameters from the second cryptographically protected communications session shared with the subset of features of the set of features of the first cryptographically protected communications session;

generating, by the network security service, network security information based at least in part on detecting the presence of the type of MITM, the network security information including the identifier;

providing the network security information to the destination server; and causing a first operation to be performed by at least terminating the second cryptographically protected communications session based at least in part on the type of MITM.

2. The computer-implemented method of claim 1, wherein the computer-implemented method further comprises determining a second operation to perform as a result of the confidence score being within a range of the confidence score.

3. A system, comprising:

one or more processors; and memory that stores computer-executable instructions that, as a result of being executed, cause the one or more processors to:

generate a data set for detecting intermediaries to a network connection that associates session features of cryptographically protected communications sessions with information indicating that a cryptographically protected communications session is being intercepted based at least in part on a plurality of previously established cryptographically protected communications sessions established at least in part using computing resources of a computing resource service provider provided to customers operating destination servers, where the session features of cryptographically protected communications sessions include a set of parameters negotiated between parties of the plurality of previously established cryptographically protected communications sessions;

obtain session feature information for a cryptographically protected communications session between a client and a destination server, the destination server implemented at least in part using the computing resources of the computing resource service provider;

determine a set of session features included in the session feature information associated with a particular type of proxy device by at least excluding from the session feature information the set of parameters associated with a set of known capabilities of a user-agent executed by the client determined based at least in part on the data set;

add the set of session features to a database associated with an identifier of the particular type of proxy device as a result of the set of session features not matching one or more other sets of session features included in the database and associated with other types of proxy devices;

generate, based at least in part on the set of session features and the identifier of the particular type of proxy device included in the database, a determination indicating the cryptographically protected communications session is being intercepted by the particular type of proxy device by at least determining a first subset of session features of the set of session features added, removed, or modified by the particular type of proxy device, where the first subset of session features is determined by at least removing from the set of session features a second subset of session features of the set of session features associated with the client and the destination server;

provide, to the destination server, a confidence score associated with the determination; and cause to be performed a security measure in response to the determination indicating that the session feature information indicates participation in the cryptographically protected communications session by the particular type of proxy device, the security measure including at least terminating the cryptographically protected communications session as a result of the identifier of the particular type of proxy device indicating an attacker eavesdropping on the cryptographically protected communications session.

4. The system of claim 3, wherein the memory further includes instructions that, as a result of being executed by the one or more processors, cause the system to modify network traffic associated with the cryptographically protected communications session.

5. The system of claim 3, wherein the instructions that cause the one or more processors to generate the determination further include instructions that, as a result of being executed, cause the one or more processors to mask a first portion of the session feature information associated with the client.

6. The system of claim 3, wherein the cryptographically protected communications session includes a transport layer security (TLS) connection.

7. The system of claim 3, wherein at least one parameter of the set of parameters indicates user-agent information.

8. The system of claim 3, wherein at least one parameter of the set of parameters indicates a set of supported cipher suites.

9. A non-transitory computer-readable storage medium storing thereon executable instructions that, as a result of being executed by one or more processors of a computer system, cause the computer system to at least:

generate a data set that indicates a set of negotiated features of cryptographically protected communications sessions between a set of clients and a set of destinations that are associated with interception of the cryptographically protected communications sessions by a set of different proxy types based at least in part on the set of negotiated features of the cryptographically protected communications sessions obtained from a plurality of cryptographically protected communications sessions established at least in part using computing resources for detecting intermediaries to a network connection of a computing resource service provider;

determine a set of features of the cryptographically protected communications sessions obtained from a destination server operated by a customer of the computing resource service provider, the destination server utilizing a network security service of the computing resource service provider, the network security service responsible for obtaining the data set, where the set of features is determined based at least in part on the data set and includes a subset of negotiated features of the set of negotiated features of the cryptographically protected communications sessions;

determine a subset of features of the set of features associated with a first type of proxy of the set of different proxy types by at least removing from the set of features associated with capabilities of a user-agent executed by a client of the set of clients and the destination server;

generate a determination that the subset of features is not associated with an identifier of the first type of proxy in a database;

add the subset of features to the database in association with an identifier of the first type of proxy as a result of the determination;

detect a presence of the first type of proxy based at least in part on the subset of features by at least comparing session features of a cryptographically protected communications session with the subset of features included in the database, the subset of features includes features added, modified, or removed by the first type of proxy;

generate, based at least in part on the presence of the first type of proxy, an indication to perform a security measure, where the indication includes at least a confidence value associated with the presence of the first type of proxy; and cause the security measure to be performed based at least in part on the indication, the security measure including at least terminating the cryptographically protected communications session based at least in part on the confidence value.

10. The non-transitory computer-readable storage medium of claim 9, wherein the instructions further comprise instructions that, as a result of being executed by the one or more processors, cause the computer system to determine an identity of the first type of proxy associated with the cryptographically protected communications session, based at least in part on the presence of the first type of proxy and the identifier generated based at least in part on the data set.

11. The non-transitory computer-readable storage medium of claim 10, wherein the first type of proxy is a corporate proxy.

12. The non-transitory computer-readable storage medium of claim 9, wherein the instructions that cause the computer system to cause the security measure to be performed further include instructions that cause the computer system to generate log information including information associated with the first type of proxy and the cryptographically protected communications session based at least in part on the confidence value being within a certain value in comparison to a threshold.

13. The non-transitory computer-readable storage medium of claim 9, wherein the instructions that cause the computer system to cause the security measure to be performed further include instructions that cause the computer system to modify network traffic of the cryptographically protected communications session based at least in part on the confidence value being within a certain value in comparison to a threshold.

14. The non-transitory computer-readable storage medium of claim 9, wherein the instructions further comprise instructions that, as a result of being executed by the one or more processors, cause the computer system to generate the identifier based at least in part on a portion of the data set associated with the first type of proxy.

15. The non-transitory computer-readable storage medium of claim 9, wherein the instructions further comprise instructions that, as a result of being executed by the one or more processors, cause the computer system to obtain the set of features of the cryptographically protected communications sessions during a handshake operation initiated by a client.

16. The computer-implemented method of claim 2, wherein the second operation is performed prior to the first operation.

17. The computer-implemented method of claim 2, wherein the second operation further comprises modifying network traffic associated with the second cryptographically protected communications session.

18. The system of claim 3, wherein instructions that cause the system to cause to be performed the security measure further include instructions that, as a result of being executed by the one or more processors, cause the system to cause to be performed the security measure based at least in part on the confidence score being within a certain value in comparison to a threshold.

19. The system of claim 3, wherein the set of parameters negotiated between parties of the plurality of previously established cryptographically protected communications sessions are negotiated during a handshake operation initiated by a client.

20. The non-transitory computer-readable storage medium of claim 9, wherein the instructions that cause the computer system to cause the security measure to be performed further include instructions that cause the computer system to modify network traffic associated with the cryptographically protected communications session prior to terminating the cryptographically protected communications session.

* * * * *